United States Patent
Woodnorth et al.

(10) Patent No.: US 6,833,217 B2
(45) Date of Patent: Dec. 21, 2004

(54) BATTERY CATHODE

(75) Inventors: Douglas J. Woodnorth, Needham, MA (US); Peter B. Harris, Stow, MA (US); Gregory A. Fariss, Poughkeepsie, NY (US); Barbara Brys, Bedford, MA (US)

(73) Assignee: Duracell Inc., Bethel, CT (US)

( * ) Notice: Subject to any disclaimer, the term of this patent is extended or adjusted under 35 U.S.C. 154(b) by 247 days.

(21) Appl. No.: 10/042,750

(22) Filed: May 22, 2002

(65) Prior Publication Data

US 2003/0079337 A1 May 1, 2003

Related U.S. Application Data

(63) Continuation of application No. 09/378,324, filed on Aug. 20, 1999, now abandoned, which is a continuation of application No. 09/054,928, filed on Apr. 3, 1998, now abandoned, which is a continuation-in-part of application No. 09/001,822, filed on Dec. 31, 1997, now abandoned.

(51) Int. Cl.[7] .................................................. H01M 6/08
(52) U.S. Cl. ........................ 429/229; 429/224; 429/206; 429/165
(58) Field of Search ................................ 429/224, 206, 429/231.8, 232, 229, 165

(56) References Cited

U.S. PATENT DOCUMENTS

| | | |
|---|---|---|
| 2,647,938 A | 8/1953 | Taylor |
| 2,993,947 A | 7/1961 | Leger |
| 3,306,776 A | 2/1967 | Tamminen |
| 3,379,569 A | 4/1968 | Berger et al. |
| 3,893,870 A | 7/1975 | Kozawa |
| 3,894,889 A | 7/1975 | Gillman et al. |
| 3,905,835 A | 9/1975 | Kasai |
| 3,925,102 A | 9/1975 | Kasai |
| 3,945,847 A | * 3/1976 | Kordesch et al. ........... 429/206 |
| 3,970,472 A | 7/1976 | Steffensen |
| 4,027,231 A | 5/1977 | Lohrmann |
| 4,091,178 A | 5/1978 | Kordesch |
| 4,105,815 A | 8/1978 | Buckler |
| 4,112,205 A | 9/1978 | Charkoudian et al. |
| 4,121,018 A | 10/1978 | Kocherginsky et al. |
| 4,125,638 A | 11/1978 | Watanabe et al. |
| 4,133,856 A | 1/1979 | Ikeda et al. |
| 4,163,811 A | 8/1979 | Kohlmayr et al. |
| 4,172,183 A | 10/1979 | Ruetschi |
| 4,177,157 A | 12/1979 | Adams |
| 4,192,914 A | 3/1980 | Ruetschi |
| 4,197,366 A | 4/1980 | Tamura et al. |
| 4,197,367 A | 4/1980 | Deborski |
| 4,209,574 A | 6/1980 | Ruetschi |
| 4,209,577 A | 6/1980 | Clash |
| 4,216,045 A | 8/1980 | Morioka |
| 4,216,279 A | 8/1980 | Mellors |
| 4,224,391 A | 9/1980 | Eisenberg |
| 4,260,669 A | 4/1981 | Kerg |

(List continued on next page.)

FOREIGN PATENT DOCUMENTS

| | | |
|---|---|---|
| CA | 8409433 | 6/1985 |
| CA | 1263697 | 12/1989 |
| EP | 0 501 609 A1 | 9/1992 |

(List continued on next page.)

OTHER PUBLICATIONS

Test results of some prior art alkaline batteries (Undated).
Chemical and physical parameters of some prior art alkaline batteries (Undated).

(List continued on next page.)

Primary Examiner—Carol Chaney
(74) Attorney, Agent, or Firm—Fish & Richardson P.C.

(57) ABSTRACT

A cathode that includes manganese dioxide and relatively small particles of nonsynthetic, nonexpanded graphite is disclosed. The graphite particles can have an average particle size of less than 20 microns. The cathode can be used in an electrochemical cell, such as a battery.

10 Claims, 1 Drawing Sheet

U.S. PATENT DOCUMENTS

| | | |
|---|---|---|
| 4,268,589 A | 5/1981 | Tamminen |
| 4,269,691 A | 5/1981 | Deborski |
| 4,273,841 A | 6/1981 | Carlson |
| 4,281,046 A | 7/1981 | Davis, Jr. |
| 4,288,506 A | 9/1981 | Coetzer et al. |
| 4,297,231 A | 10/1981 | Kahara et al. |
| 4,306,005 A | 12/1981 | Ruben |
| 4,310,609 A | 1/1982 | Liang et al. |
| 4,324,828 A | 4/1982 | Ebato et al. |
| 4,330,602 A | 5/1982 | O'Rell et al. |
| 4,366,215 A | 12/1982 | Coetzer et al. |
| 4,378,414 A | 3/1983 | Furukawa et al. |
| 4,379,817 A | 4/1983 | Kozawa |
| 4,405,699 A | 9/1983 | Kruger |
| 4,419,423 A | 12/1983 | Leger |
| 4,421,834 A | 12/1983 | Zupancic |
| 4,427,751 A | 1/1984 | Furukawa et al. |
| 4,455,358 A | 6/1984 | Graham et al. |
| 4,465,747 A | 8/1984 | Evans |
| 4,466,470 A | 8/1984 | Bruder |
| 4,478,921 A | 10/1984 | Langan |
| 4,490,449 A | 12/1984 | Moses et al. |
| 4,595,643 A | 6/1986 | Koshiba et al. |
| 4,604,336 A | 8/1986 | Nardi |
| 4,636,445 A | 1/1987 | Yamano et al. |
| 4,734,344 A | 3/1988 | Choi |
| 4,767,687 A | 8/1988 | LaBonte |
| 4,777,100 A | 10/1988 | Chalilpoyil et al. |
| 4,778,737 A | 10/1988 | Sehm |
| 4,869,980 A | 9/1989 | Jarvis et al. |
| 4,894,296 A | 1/1990 | Borbely et al. |
| 4,942,101 A | 7/1990 | Audebert et al. |
| 4,957,827 A | 9/1990 | Kordesch et al. |
| 4,959,282 A | 9/1990 | Dahn et al. |
| 4,977,045 A | 12/1990 | Mohri |
| 5,011,752 A | 4/1991 | Kordesch et al. |
| 5,026,617 A | 6/1991 | Kosaka et al. |
| 5,051,323 A | 9/1991 | Murphy |
| 5,069,988 A | 12/1991 | Tomantschger et al. |
| 5,108,852 A | 4/1992 | Tomantschger et al. |
| 5,112,705 A | 5/1992 | Hunter et al. |
| 5,132,177 A | 7/1992 | Kawano et al. |
| 5,137,542 A * | 8/1992 | Buchanan et al. ............ 51/295 |
| 5,156,934 A | 10/1992 | Kainthia et al. |
| 5,162,169 A | 11/1992 | Tomantschger et al. |
| 5,202,063 A | 4/1993 | Andrews et al. |
| 5,204,195 A | 4/1993 | Tomantschger et al. |
| 5,215,836 A | 6/1993 | Eisenberg |
| 5,219,685 A | 6/1993 | Taniguchi et al. |
| 5,225,104 A | 7/1993 | Van Steenkiste et al. |
| 5,277,890 A | 1/1994 | Wang et al. |
| 5,281,497 A | 1/1994 | Kordesch et al. |
| 5,283,139 A * | 2/1994 | Newman et al. ............ 429/224 |
| 5,285,299 A | 2/1994 | Drzaic et al. |
| 5,302,475 A | 4/1994 | Adler et al. |
| 5,308,711 A | 5/1994 | Passaniti et al. |
| 5,308,714 A | 5/1994 | Crespi |
| 5,318,866 A | 6/1994 | Degen et al. |
| 5,336,571 A | 8/1994 | Tomantschger et al. |
| 5,340,666 A | 8/1994 | Tomantschger et al. |
| 5,348,726 A | 9/1994 | Wang et al. |
| 5,378,562 A | 1/1995 | Passaniti et al. |
| 5,389,470 A | 2/1995 | Parker et al. |
| 5,397,503 A | 3/1995 | Yuasa et al. |
| 5,419,987 A | 5/1995 | Goldstein et al. |
| 5,424,145 A | 6/1995 | Tomantschger et al. |
| 5,453,336 A | 9/1995 | Adler et al. |
| 5,455,125 A | 10/1995 | Matsumoto et al. |
| 5,460,902 A | 10/1995 | Parker et al. |
| 5,464,709 A | 11/1995 | Getz et al. |
| 5,482,798 A | 1/1996 | Mototani et al. |
| 5,489,492 A | 2/1996 | Asami et al. |
| 5,489,493 A | 2/1996 | Urry |
| 5,514,488 A | 5/1996 | Hake et al. |
| 5,556,720 A | 9/1996 | Charkey |
| 5,561,006 A | 10/1996 | Lecerf et al. |
| 5,569,558 A | 10/1996 | Takeuchi et al. |
| 5,569,561 A | 10/1996 | Exnar et al. |
| 5,571,640 A | 11/1996 | Takeuchi et al. |
| 5,585,208 A | 12/1996 | Lian et al. |
| 5,604,057 A | 2/1997 | Nazri |
| 5,607,796 A | 3/1997 | Jacus et al. |
| 5,610,511 A | 3/1997 | Parker |
| 5,626,988 A | 5/1997 | Daniel-Ivad et al. |
| 5,639,576 A | 6/1997 | Lewis et al. |
| 5,652,043 A | 7/1997 | Nitzan |
| 5,654,112 A | 8/1997 | Itou et al. |
| 5,660,953 A | 8/1997 | Bai et al. |
| 5,674,644 A | 10/1997 | Nazri |
| 5,686,204 A | 11/1997 | Bennett et al. |
| 6,084,380 A | 7/2000 | Burton |
| 6,118,426 A | 9/2000 | Albert et al. |

FOREIGN PATENT DOCUMENTS

| | | |
|---|---|---|
| JP | 5679854 | 6/1981 |
| JP | 56-87021 | 7/1981 |
| JP | 5753067 | 3/1982 |
| JP | 57170455 A | 10/1982 |
| JP | 58129764 A | 8/1983 |
| JP | 58189963 A | 11/1983 |
| JP | 59014269 A | 1/1984 |
| JP | 60204056 | 11/1985 |
| JP | 61-169781 | 7/1986 |
| JP | 62211863 A | 9/1987 |
| JP | 63218161 A | 9/1988 |
| JP | 63232266 A | 9/1988 |
| JP | 01035870 A | 2/1989 |
| JP | 01281672 A | 11/1989 |
| JP | 04174964 | 6/1992 |
| JP | 05225966 A | 9/1993 |
| JP | 05335006 A | 12/1993 |
| JP | 06045002 A | 2/1994 |
| JP | 07282802 A | 10/1995 |
| JP | 07335227 A | 12/1995 |
| JP | 08138686 A | 5/1996 |
| JP | 8-203567 | 8/1996 |
| JP | 09115516 A | 5/1997 |
| JP | 09115522 A | 5/1997 |
| JP | 09180736 A | 7/1997 |
| JP | 10-268798 | 10/1998 |
| WO | WO 97/11360 | 3/1997 |
| WO | WO 99/05745 | 2/1999 |
| WO | WO 00/26761 | 5/2000 |

OTHER PUBLICATIONS

"All Printed Bistable Reflective Displays: Printable Electrophoretic Ink and All Printed Metal–Insulator–Metal Diodes", Massachusetts Institute of Technology, 6/98, pps. 1–19.

"Electrophoretic Displays", J.C. Lewis, 1976, pps. 223–240.

"Electrophoretic Displays", A.L. Dalisa, pps. 213–232.

"The Reinvention of Paper", Scientific American, Sep. 1998, pp. 36, 40.

"An Electrophoretic Ink for All–Printed Reflective Electronic Displays", Comiskey et al., Nature, vol. 394, Jul. 16, 1998; pp. 253–255.

"Electronic Ink: A printable display system", Comiskey et al., Jun. 1997, pp. 1–3.

"Easy Reader", J. Wilson, Popular Mechanics, Nov. 1998, pp. 94–96, 98.

* cited by examiner

BATTERY CATHODE

CROSS REFERENCE TO RELATED APPLICATION

This application is a Continuation of U.S. application Ser. No. 09/378,324, filed Aug. 20, 1999, now abandoned, which is a Continuation of U.S. application Ser. No. 09/054,928, filed Apr. 3, 1998, abandoned, which is a Continuation-in-Part of U.S. application Ser. No. 09/001,822, filed Dec. 31, 1997, abandoned.

BACKGROUND OF THE INVENTION

The present invention relates to batteries.

Batteries, such as alkaline batteries, are commonly used as energy sources. Generally, alkaline batteries have a cathode, an anode, a separator and an electrolytic solution. The cathode is typically formed of manganese dioxide, carbon particles and a binder. The anode can be formed of a gel including zinc particles. The separator is usually disposed between the cathode and the anode. The electrolytic solution, which is dispersed throughout the battery, can be a hydroxide solution.

SUMMARY OF THE INVENTION

The invention relates to batteries, such as alkaline batteries, having cathodes that include manganese dioxide and relatively small nonsynthetic, nonexpanded graphite particles. These batteries have good performance characteristics. For example, the batteries can exhibit high energy output at a high discharge rate, such as a discharge rate equal to at least the battery's capacity (in units of Ampere-hours) discharged in one hour. The batteries can have various industry standard sizes, such as AA, AAA, AAAA, C or D.

"Nonsynthetic graphite particles" refer to graphite particles that are prepared without using an industrial or laboratory graphitization process.

"Nonexpanded graphite particles" refer to graphite particles that are prepared without any industrial or laboratory particle expansion process.

In one aspect, the invention features a cathode that includes manganese dioxide and nonsynthetic, nonexpanded graphite particles having an average particle size of less than about 20 microns.

The particle size is measured using a Sympatec HELIOS analyzer. For a given sample of graphite particles, the average particle size is the particle size for which half the volume of the sample has a smaller particle size.

In another aspect, the invention features an electrochemical cell including a cathode, an anode and a separator disposed between the cathode and the anode. The cathode includes manganese dioxide and nonsynthetic, nonexpanded graphite particles having an average particle size of less than about 20 microns.

In some embodiments, the separator includes a nonwoven, non-membrane material and a second nonwoven, non-membrane material disposed along a surface of the first material. In these embodiments, the separator can be devoid of a membrane layer or an adhesive layer disposed between the nonwoven, non-membrane materials. A membrane material refers to a material having an average pore size of less than about 0.5 micron, whereas a non-membrane material refers to a material having an average pore size of at least about 5 microns.

The cathode can have a porosity of from about 21% to about 28%. The porosity of the cathode is the relative volume of the cathode that is not taken up by solid material, such as, for example, manganese dioxide, graphite particles and binder.

The anode can have a porosity of from about 2 grams of zinc particles to about 2.45 grams of zinc particles per cubic centimeter of anode volume that is taken up by liquid or solid material.

The battery can have a relatively small amount of manganese dioxide and/or zinc particles compared to the amount of electrolytic solution. For example, the weight ratio of manganese dioxide to electrolytic solution can be from about 2.2 to about 2.9, and the weight ratio of zinc particles to electrolytic solution can be from about 0.9 to about 1.25. This is calculated based on the amount of electrolytic solution dispersed throughout the cathode, the anode and the separator.

The batteries can be AA or AAA batteries that demonstrate good results when tested according to the cc photo test, the 1 Watt continuous test, the half Watt continuous test, the pulsed test, the half Watt rm test and/or the quarter Watt rm test. These tests are described below.

Other features and advantages of the invention will be apparent from the description of the preferred embodiments thereof and the claims.

BRIEF DESCRIPTION OF THE DRAWING

The FIGURE is a cross-sectional view of a battery.

DESCRIPTION OF THE PREFERRED EMBODIMENTS

Figure 1:
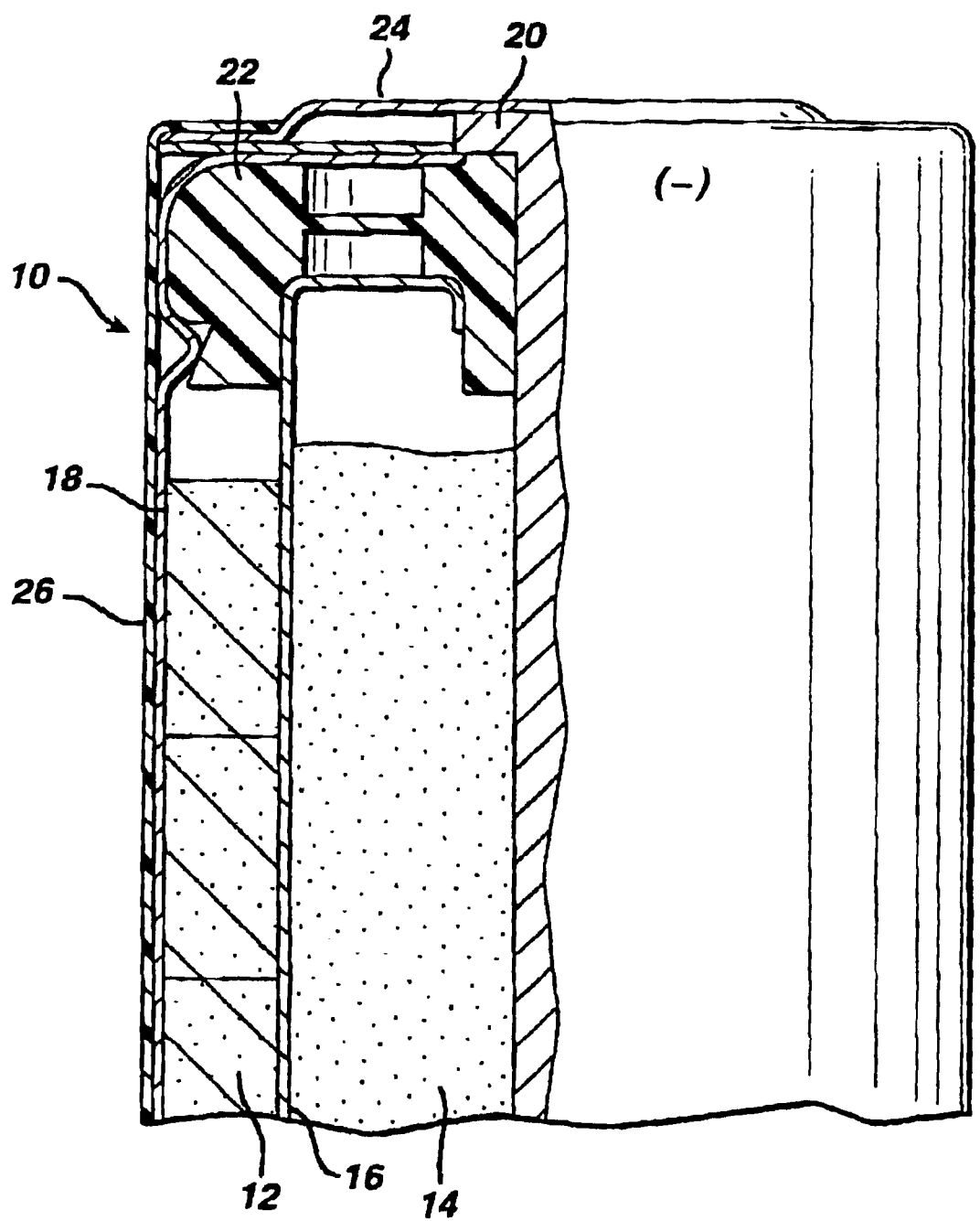

The preferred batteries are alkaline batteries that have a cathode formed of manganese dioxide, relatively small, nonsynthetic, nonexpanded graphite particles and optionally a binder.

Referring to the FIGURE, a battery 10 is shown that has a cathode 12, an anode 14, a separator 16, an outer wall 18 that contacts the outer diameter of cathode 12 and insulating layer 26. Battery 10 further includes an anode collector 20 that passes through a seal member 22 and into anode 14. The upper end of anode collector 20 is connected to a negative end cap 24 which serves as the negative external terminal of battery 10. Layer 26 can be formed of an electrically nonconducting material, such as a heat shrinkable plastic. In addition, an electrolytic solution is dispersed throughout battery 10.

If the graphite particles disposed within cathode 12 are too large, the conductivity of cathode 12 may not be sufficiently low. However, if the graphite particles are too small, cathode 12 may be comparatively dense, reducing the amount of electrolytic solution in cathode 12 and decreasing the efficiency of battery 10. Therefore, the graphite particles in cathode 12 preferably have an average particle size of at most 20 microns, more preferably from about 2 microns to about 12 microns and most preferably from about 5 microns to about 9 microns as measured using a Sympatec HELIOS analyzer. In some embodiments, the graphite particles are nonexpanded, nonsynthetic graphite particles having an average particle size of about 7 microns as measured by this method. Nonsynthetic, nonexpanded graphite particles are available from, for example, Brazilian Nacional de Grafite (Itapecirica, MG Brazil).

The amount of graphite particles disposed within cathode 12 should be enough to improve the overall conductivity of cathode 12 while having minimal impact on the energy capacity of battery 10. Preferably, cathode 12 is from about 4 weight percent to about 10 weight percent graphite particles, more preferably from about 5 weight percent to about 9 weight percent graphite particles, and most preferably from about 6 weight percent to about 8 weight percent graphite particles. These weight percentage ranges correspond to when the electrolytic solution is not dispersed within cathode 12.

Cathode 12 can be a single pellet of material. Alternatively, cathode 12 can be formed of a number of cathode pellets that are stacked on top of each other. In either case, the cathode pellets can be made by first mixing the manganese dioxide, graphite particles and optionally the binder. For embodiments in which more than one pellet is used, the mixture can be pressed to form the pellets. The pellet(s) are fit within battery 10 using standard processes. For example, in one process, a core rod is placed in the central cavity of battery 10, and a punch is then used to pressurize the top most pellet. When using this process, the interior of wall 18 can have one or more vertical ridges that are spaced circumferentially around wall 18. These ridges can assist in holding cathode 12 in place within battery 10.

In embodiments in which cathode 12 is formed of a single pellet, the powder can be placed directly within battery 10. A retaining ring is set in place, and an extrusion rod passes through the ring, densifying the powder and forming cathode 12.

In certain embodiments, a layer of conductive material can be disposed between wall 18 and cathode 12. This layer may be disposed along the inner surface of wall 18, along the outer circumference of cathode 12 or both. Typically, this conductive layer is formed of a carbonaceous material. Such materials include LB1000 (Timcal), Eccocoat 257 (W.R. Grace & Co.), Electrodag 109 (Acheson Industries, Inc.), Electrodag 112 (Acheson) and EB005 (Acheson). Methods of applying the conductive layer are disclosed in, for example, Canadian Patent No. 1,263,697, which is hereby incorporated by reference.

Using a conductive layer, especially Electrodag 109 or EB005, between wall 18 and cathode 12 can reduce the pressure used when forming cathode 12 within battery 10. Thus, the porosity of cathode 12 can be made relatively high without causing the pellet(s) to be crushed or crack when forming cathode 12 within battery 10. However, if the porosity of cathode 12 is too low, an insufficient amount of electrolytic solution can be dispersed within cathode 12, reducing the efficiency of battery 10. Thus, in certain embodiments, cathode 12 has a porosity of from about 21% to about 28%, more preferably from about 25% to about 27%, and most preferably about 26%.

Within cathode 12, any of the conventional forms of manganese dioxide for batteries can be used. Distributors of such manganese dioxide include Kerr McGee, Co., Broken Hill Proprietary, Chem Metals, Co., Tosoh, Delta Manganese, Mitsui Chemicals and JMC.

In certain embodiments, cathode 12 can have from about 8.9 grams of manganese dioxide to about 9.8 grams of manganese dioxide. In these embodiments, cathode 12 preferably includes from about 9.3 grams to about 9.8 grams of manganese dioxide, more preferably from about 9.4 grams to about 9.65 grams of manganese dioxide, and most preferably from about 9.45 grams of manganese dioxide to about 9.6 grams of manganese dioxide.

In other embodiments, cathode 12 preferably includes from about 4 grams to about 4.3 grams of manganese dioxide, more preferably from about 4.05 grams to about 4.25 grams of manganese dioxide, and most preferably from about 4.1 grams to about 4.2 grams of manganese dioxide.

In some embodiments, cathode 12 may further include a binder. Examples of binders for cathode 12 include polyethylene powders, polyacrlyamides, Portland cement and fluorocarbon resins, such as PVDF and PTFE. In certain embodiments, cathode 12 includes a polyethylene binder sold under the tradename coathylene HA-1681 (Hoescht). When cathode 12 includes a binder, the binder preferably makes up less than about 1 weight percent of cathode 12, more preferably from about 0.1 weight percent to about 0.5 weight percent of cathode 12, and most preferably about 0.3 weight percent of cathode 12. These weight percentages correspond to when the electrolytic solution is not dispersed within cathode 12.

Cathode 12 can include other additives. Examples of these additives are disclosed in U.S. Pat. No. 5,342,712, which is hereby incorporated by reference. In some embodiments, cathode 12 preferably includes from about 0.2 weight percent to about 2 weight percent $TiO_2$, more preferably about 0.8 weight percent $TiO_2$.

Anode 14 can be formed of any of the standard zinc materials used in battery anodes. Often, anode 14 is formed of a zinc gel that includes zinc metal particles, a gelling agent and minor amounts of additives, such as gassing inhibitors.

If the porosity of anode 14 is too high, the amount of zinc within battery 10 is reduced which decreases the energy capacity of battery 10. However, if the porosity of anode 14 is too low, an insufficient amount of electrolytic solution can be dispersed within anode 14. Therefore, in some embodiments, anode 14 preferably has from about 2 grams to about 2.45 grams of zinc particles per cubic centimeter of anode volume, more preferably from about 2.1 grams to about 2.35 grams of zinc particles per cubic centimeter of anode volume, and most preferably from about 2.15 grams to about 2.3 grams of zinc particles per cubic centimeter of anode volume.

In certain embodiments, anode 14 preferably has from about 3.7 grams to about 4.25 grams of zinc particles, more preferably from about 3.8 to about 4.15 grams of zinc particles, and most preferably from about 3.9 grams to about 4.05 grams of zinc particles.

In other embodiments, anode 14 preferably has from about 1.5 grams to about 1.9 grams of zinc particles, more preferably from about 1.55 to about 1.85 grams of zinc particles, and most preferably from about 1.65 grams to about 1.75 grams of zinc particles.

In some embodiments, anode 14 preferably includes from about 64 weight percent to about 76 weight percent zinc particles, more preferably from about 66 weight percent to about 74 weight percent zinc particles, and most preferably from about 68 weight percent to about 72 weight percent zinc particles. These weight percentages correspond to when the electrolytic solution is dispersed within anode 14.

Gelling agents that can be used in anode 14 include polyacrylic acids, grafted starch materials, polyacrylates, salts of polyacrylic acids, carboxymethylcellulose or combinations thereof. Examples of such polyacrylic acids are Carbopol 940 (B.F. Goodrich) and Polygel 4P(3V), and an example of a grafted starch material is Waterlock A221 (Grain Processing Corporation, Muscatine, Iowa). An example of a salt of a polyacrylic acid is CL15 (Allied Colloids). In some embodiments, anode 14 preferably includes from about 0.2 weight percent to about 1 weight percent total gelling agent, more preferably from about 0.4 weight percent to about 0.7 weight percent total gelling agent, and most preferably from about 0.5 weight percent to about 0.6 weight percent total gelling agent. These weight percentages correspond to when the electrolytic solution is dispersed within anode 14.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 is formed of two layers of nonwoven, non-membrane material with one layer being disposed along a surface of the other. In these embodiments, the separator preferably does not include a layer of membrane material or a layer of adhesive between the nonwoven, non-membrane layers. To minimize the volume of separator 16 while providing an efficient battery, each layer of nonwoven, non-membrane material can have a basis weight of about 54 grams per square meter, a thickness of about 5.4 mils when dry and a thickness of about 10 mils when wet. In one embodiment, the nonwoven, non-membrane material is a matrix of polyvinyl alcohol (PVA) fibers, cellulose fibers and PVA binder. Generally, the nonwoven, non-membrane material is devoid of fillers such as, for example, inorganic particles.

In other embodiments, separator 16 includes an outer layer of cellophane with a layer of nonwoven material. Separator 16 also includes an additional layer of nonwoven material. The cellophane layer can be adjacent cathode 12 or anode 14. Preferably, the nonwoven layer contains from about 78 weight percent to about 82 weight percent PVA and from about 18 weight percent to about 22 weight percent rayon with a trace of surfactant. Such nonwoven materials are available from PDM under the tradename PA36.

The electrolytic solution dispersed throughout battery 10 can be any of the conventional electrolytic solutions used in batteries. Typically, the electrolytic solution is an aqueous hydroxide solution. Such aqueous hydroxide solutions include, for example, potassium hydroxide solutions and sodium hydroxide solutions. In some embodiments, the electrolytic solution is an aqueous solution of potassium hydroxide including from about 33 weight percent to about 38 weight percent potassium hydroxide.

In certain embodiments, battery 10 preferably includes from about 3.4 grams to about 3.9 grams of electrolytic solution, more preferably from about 3.45 grams to about 3.65 grams of electrolytic solution, and most preferably from about 3.5 grams to about 3.6 grams of electrolytic solution.

In other embodiments, battery 10 preferably includes from about 1.6 grams to about 1.9 grams of electrolytic solution, more preferably from about 1.65 grams to about 1.85 grams of electrolytic solution, and most preferably from about 1.7 grams to about 1.8 grams of electrolytic solution.

The weight ratio of manganese dioxide to electrolytic solution can be from about 2.2 to about 2.9, and the weight ratio of zinc particles to electrolytic solution can be from about 0.9 to about 1.25. In some embodiments, the weight ratio of manganese dioxide to electrolytic solution is from about 2.5 to about 2.9, and the weight ratio of zinc particles to electrolytic solution is from about 1.1 to about 1.25. In other embodiments, the weight ratio of manganese dioxide to electrolytic solution is from about 2.5 to about 2.65, and the weight ratio of zinc particles to electrolytic solution is from about 0.9 to about 1.2. These weight ratios are based on the amount of electrolytic solution dispersed throughout the anode, cathode and separator.

The batteries can be AA or AAA batteries that demonstrate good results when tested according to the cc photo test, the 1 Watt continuous test, the half Watt continuous test, the pulsed test, the half Watt rm rest and/or the quarter Watt rm test. These tests are described below.

Battery 10 can be a AA battery that exhibits excellent performance according to the cc photo test (described below). For example, when discharging to 1 Volt according to the cc photo test, the AA battery can give at least about 150 pulses, at least about 175 pulses, at least about 185 pulses or at least about 200 pulses. When discharging to 0.8 Volts according to the cc photo test, the AA battery can give at least about 350 pulses, at least about 375 pulses, at least about 385 pulses or at least about 400 pulses.

Battery 10 can be a AA battery that exhibits excellent performance according to the 1 Watt continuous test (described below). For example, when discharging to 1 Volt according to the 1 Watt continuous test, the AA battery can give at least about 0.6 hours, at least about 0.65 hours, at least about 0.7 hours or at least about 0.75 hours. When discharging to 0.8 Volts according to the 1 Watt continuous test, the AA battery can give at least about 0.95 hours, at least about 1 hour, at least about 1.05 hours or at least about 1.1 hours.

Battery 10 can be a AA battery that offers excellent performance according to the pulsed test (described below). For example, when discharging to 1 Volt according to the pulsed test, the AA battery can give at least about 1.6 hours, at least about 1.75 hours, at least about 2 hours or at least about 2.15 hours. When discharging to 0.8 Volts according to the pulsed test, the AA battery can give at least about 2.75 hours, at least about 3 hours, at least about 3.25 hours or at least about 3.3 hours.

Battery 10 can be a AA battery that offers excellent performance according to the half Watt rm test (described below). For example, when discharged to 1.1 Volts according to the half Watt rm test, the AA battery can give at least about 1.5 hours, at least about 2 hours, at least about 2.5 hours or at least about 2.65 hours. When discharged to 0.9 Volta according to the half Watt rm test, the AA battery can give at least 2.9 hours, at least about 3 hours, at least about 3.25 hours or at least about 3.4 hours.

Battery 10 can be a AAA battery that offers excellent performance according to the halt Watt continuous test (described below). For example, when discharged to 1 Volt according to the half Watt continuous test, the AAA battery can give at least about 0.65 hours, at least about 0.7 hours, at least about 0.75 hours or at least about 0.8 hours. When discharged to 0.9 Volts according to the half Watt continuous test, the AAA battery can give at least 0.9 hours, at least about 0.95 hours, at least about 1. hour or at least about 1.05 hours.

Battery 10 can be a AAA battery that offers excellent performance according to the pulsed test (described below). For example, when discharged to 1 Volt according to the pulsed test, the AAA battery can give at least about 0.35 hours, at least about 0.4 hours, at least about 0.45 hours or at least about 0.5 hours. When discharged to 0.9 Volts according to the pulsed test, the AAA battery can give at least 0.65 hours, at least about 0.7 hours or at least about 0.75 hours or at least about 0.8 hours.

Battery 10 can be a AAA battery that offers excellent performance according to the half Watt rm test (described below). For example, when discharged to 1.1 Volts according to the half Watt rm test, the AAA battery can give at least about 0.4 hours, at least about 0.45 hours, at least about 0.5 hours or at least about 0.55 hours. When discharged to 0.9 Volts according to the half Watt rm test, the AAA battery can give at least 0.9 hours, at least about 0.95 hours, at least about 1 hour or at least about 1.05 hours.

Battery 10 can be a AAA battery that offers excellent performance according to the quarter Watt rm test (described below). For example, when discharged to 1.1 Volts according to the quarter Watt rm test, the AAA battery can give at least about 2 hours, at least about 2.1 hours, at least about 2.2 hours or at least about 2.3 hours. When discharged to 0.9 Volts according to the quarter Watt rm test, the AAA battery can give at least 3.1 hours, at least about 3.25 hours, at least about 3.4 hours or at least about 3.5 hours.

EXAMPLE I

AA batteries were prepared with the following components. The cathode included about 9.487 grams of manganese dioxide (Kerr-McGee, Co,), about 0.806 grams of nonsynthetic, nonexpanded graphite having an average particle size of about 7 microns (Brazilian Nacional de Grafite) and about 0.3 weight percent of coathylene HA-1681. The anode included about 3.976 grams of zinc particles, about 50 ppm surfactant (RMS10, Rhone Poulenc) relative to zinc, and about 0.5 weight percent total gelling agent (Carbopol 940 and A221). The porosity of the cathode was about 26%, and the porosity of the anode was about 2.173 grams of zinc per cubic centimeter of anode. The separator was a two-layer structure with each layer formed of a nonwoven material including about 57 weight percent PVA fibers (about 0.5 denier at 6 millimeters), about 30 weight percent rayon fibers (about 1.5 denier at 6 millimeters) and about 13 weight percent PVA binder. Each layer was about 5.4 mils thick when dry and about 10 mils thick when wet. Each layer had a basis weight of about 54 grams per square meter. The separator did not include an adhesive, and the layers were substantially devoid of any filler. The battery also included about 3.598 grams of an aqueous potassium hydroxide (about 35.5 weight percent potassium hydroxide) solution. A thin coating of EB005 (Acheson) was disposed between the outer wall of the battery and the outer periphery of the cathode.

The AA batteries were stored at a temperature of from about 20.1° C. to about 22.1° C. for five days. The AA batteries were then stored according to the following procedure.

Each battery is visually examined for leakage or material damage and identified such that battery identification can be maintained throughout the test program. The batteries are oriented on their sides in holding trays such that the batteries are not in physical contact with each other. The holding trays are made to be resistant to heat and electrolytes. The trays are stored for 1 day at ambient conditions, after which the trays are placed into a preheated chamber. The trays are spaced so that there is at least about 5 cm (2 inches) of space between the chamber wall, and the tray above, below, or adjacent to each tray. The following 24 hour test sequence, shown in Table I, is repeated for 14 days.

TABLE I

| Cycle Number | Time (Hrs.) | Temperature (± 2° C.) |
|---|---|---|
| 1 | 6.0 | Ramp from 28 to 25 |
| 2 | 4.5 | Ramp from 25 to 34 |
| 3 | 2.0 | Ramp from 34 to 43 |
| 4 | 1.0 | Ramp from 43 to 48 |
| 5 | 1.0 | Ramp from 48 to 55 |
| 6 | 1.0 | Ramp from 55 to 48 |
| 7 | 1.0 | Ramp from 48 to 43 |
| 8 | 3.0 | Ramp from 43 to 32 |
| 9 | 4.5 | Ramp from 32 to 28 |
| | 24.0 (1 Day) | |

The trays are removed from the chamber and each battery is visually examined for leakage or material damage.

The following tests were subsequently performed on individual AA batteries. Each test was conducted at a temperature of from about 20.1° C. to about 22.1° C.

A AA battery was discharged from an open circuit voltage of about 1.6 Volts under constant current conditions of ten seconds per minute for one hour per day ("the cc photo test"). The AA battery reached 1 Volt after 203 pulses, and the AA battery reached 0.8 Volts after 443 pulses.

A AA battery was continuously discharged from an open circuit voltage of about 1.6 Volts at 1 Watt ("the 1 Watt continuous test"). The AA battery reached 1 Volt after about 0.75 hours, and the AA battery reached 0.8 Volts after about 1.00 hours.

A AA battery was continuously discharged from an open circuit voltage of about 1.6 Volts at a rate that alternated between 1 Watt (3 second pulses) and 0.1 Watt (7 second pulses) ("the pulsed test"). The AA battery reached 1 volt after about 2.16 hours, and the AA battery reached 0.8 Volts after about 3.72 hours.

A AA battery was discharged from an open circuit voltage of about 1.6 Volts at 0.5 Watts for 15 minutes per hour ("the half Watt rm test"). The AA battery reached 1.1 Volts after about 1.87 hours, and the AA battery reached 0.9 Volts after about 3.34 hours.

EXAMPLE II

A AAA battery was prepared. The cathode 12 included about 4.155 grams of manganese dioxide (Kerr McGee, Co.), about 0.353 grams of nonsynthetic, nonexpanded graphite having an average particle size of about 7 microns (Brazilian Nacional de Grafite) and about 0.3 weight percent of coathylene HA-1681. The anode 14 included about 1.668 grams of zinc particles and about 0.5 weight percent total gelling agent (Carbopol 940 and A221). The porosity of the cathode was about 26%, and the porosity of the anode was about 2.266 grams of zinc per cubic centimeter of anode 14. The separator included two layers of nonwoven material. The separator was a two-layer structure with each layer formed of a nonwoven material including about 57 weight percent PVA binders (about 0.5 denier at 6 millimeters), about 30 weight percent cellulose fibers (about 1.5 denier at 6 millimeters) and about 13 weight percent PVA binder. Each layer was about 5.4 millimeters thick when dry and about 10 millimeters thick when wet. Each layer had a basis weight of about 54 grams per square meter. The separator did not include an adhesive, and the layers were substantially devoid of any filler. The battery also included about 1.72 grams of an aqueous potassium hydroxide (about 35.5 weight percent) solution. A thin coating of EB005 was disposed between the outer wall of the battery and the outer periphery of the cathode.

The AAA batteries were stored as described in Example I. Each AAA battery was discharged from an open circuit voltage of about 1.6 Volts, and the tests were conducted within the temperature range described in Example I.

A AAA battery was continuously discharged from an open circuit voltage of about 1.6 Volts at one half Watt ("the half Watt continuous test"). The AAA battery reached 1 Volt after about 0.76 hours, and the AAA battery reached 0.8 Volts after about 0.96 hours.

With the pulsed test, a AAA battery took about 0.55 hours to reach 1 Volt, and about 0.84 hours to reach 0.8 Volts.

With the half Watt rm test, a AAA battery took about 0.57 hours to reach 1 Volt, and about 1.08 hours to reach 0.8 Volts.

A AAA battery was discharged from an open circuit voltage of about 1.6 Volts at 0.25 Watts for 15 minutes per hour ("the quarter Watt rm test"). The AAA battery reached 1.1 Volts after about 2.4 hours, and the AAA battery reached 0.9 Volts after about 3.65 hours.

EXAMPLE III

AA batteries were prepared with the following components. The cathode included about 9.11 grams of manganese dioxide (40:60 weight mixture of Delta:Tosoh), about 0.810 grams of nonsynthetic, nonexpanded graphite having an average particle size of about 7 microns (Brazilian Nacional de Grafite) and about 0.8 weight percent of titanium dioxide (Kronos). The anode included about 3.89 grams of zinc particles, about 0.88 weight percent total gelling agent (3V and CL15), and about 50 ppm of surfactant (RM 510, Rhone Poulenc). The porosity of the cathode was about 23%, and the porosity of the anode was about 2.173 grams of zinc per cubic centimeter of anode. The separator included a layer of nonwoven material (PA36 A, PDM) a layer of PA36C and a layer of cellophane (1 mil. thick). The cellophane was adjacent to the cathode, and the nonwoven PA36A layer was adjacent to the anode. The battery also included about 3.62 grams of aqueous potassium hydroxide (about 35.5 weight percent potassium hydroxide) solution. A thin coating of EB005 (Acheson) was disposed between the outer wall of the battery and the outer periphery of the cathode.

The AA batteries were stored at a temperature of from about 20.1° C. to about 22.1° C. for about five days according to the protocol described in Example I. The following tests were subsequently performed on individual AA batteries. Each test was conducted at a temperature of from about 20.1° C. to about 22.1° C.

The AA battery was discharged according to the cc photo test. The AA battery reached one volt after 180 pulses, and the AA battery reached 0.8 volts after 347 pulses.

A AA battery was discharged according to the one Watt continuance test. The AA battery reached 1 volt after about 0.57 hours, and the AA battery reached 0.8 volts after about 0.80 hours.

A AA battery was continuously discharged from an open circuit voltage according to the pulsed test. The AA battery reached 1 volt after about 1.76 hours, and the AA battery reached 0.8 volts after about 3.11 hours.

A AA battery was discharged according to the half Watt rm test. The AA battery reached 1.1 volts after about 1.66 hours, and the AA battery reached 0.9 volts after about 3.05 hours.

Other embodiments are within the claims.

What is claimed is:

1. A method of making an electrochemical cell, comprising constructing an electrochemical cell including a housing having an interior surface and, within the housing, (1) a conductive layer of a carbonaceous material in contact with the interior surface of the housing; (2) a cathode in contact with the conductive layer and comprising manganese dioxide and at most 10% by weight graphite particles having an average particle size of less than 20 microns that were prepared without using an industrial or laboratory graphitization process and without any industrial or laboratory expansion process; (3) an anode inside the cathode comprising zinc particles and a gassing inhibitor selected from the group consisting of bismuth, tin, and indium; (4) a separator disposed between, and in contact with, the cathode and the anode; (5) an alkaline electrolytic solution; and (6) a current collector centrally located in the cell in contact with the anode.

2. The method of claim 1, wherein the graphite particles have an average particle size of less than about 12 microns.

3. The method of claim 1, wherein the graphite particles have an average size of from about 2 microns to about 12 microns.

4. The method of claim 1, wherein the graphite particles have an average size of from about 5 microns to about 9 microns.

5. The method of claim 1, wherein the separator comprises a first nonwoven, non-membrane material and a second nonwoven, non-membrane material disposed along a surface of the first nonwoven, non-membrane material.

6. the method of claim 1, wherein the cathode has a porosity of from about 24% to about 28%.

7. The method of claim 1, wherein the anode has a porosity of from about 2 grams of zinc particles to about 2.45 grams of zinc particles per cubic centimeter of anode volume.

8. The method of claim 1, wherein a weight ratio of the manganese dioxide to the electrolytic solution is from about 2.4 to about 2.9.

9. The method of claim 1, wherein the weight ratio of the zinc particles to the electrolytic solution is from about 0.9 to about 1.25.

10. The method of claim 1, wherein the cathode further comprises a binder.

* * * * *

UNITED STATES PATENT AND TRADEMARK OFFICE
CERTIFICATE OF CORRECTION

PATENT NO. : 6,833,217 B2
DATED : December 21, 2004
INVENTOR(S) : Douglas J. Woodnorth et al.

It is certified that error appears in the above-identified patent and that said Letters Patent is hereby corrected as shown below:

Title page,
Item [56], References Cited, U.S. PATENT DOCUMENTS, after "3,970,472" reference, replace "7/1976" with -- 12/1975 --; after "4,172,813" reference, replace "Ruetschi" with -- Rüetschi --; after "5,285,299" reference, replace "Drzaic" with -- Drazaic --; and after "6,084,380" reference, replace "7/2000" with -- 9/2000 --.

Column 10,
Line 43, before "method" replace "the" with -- The --.

Signed and Sealed this

Fifth Day of July, 2005

JON W. DUDAS
*Director of the United States Patent and Trademark Office*